United States Patent
Becenel, Jr.

(10) Patent No.: US 7,037,481 B2
(45) Date of Patent: May 2, 2006

(54) PRODUCTION OF ULTRA PURE SALT

(75) Inventor: Lawrence F. Becenel, Jr., Sugar Land, TX (US)

(73) Assignee: United Brine Services Company, LLC, Houston, TX (US)

( * ) Notice: Subject to any disclaimer, the term of this patent is extended or adjusted under 35 U.S.C. 154(b) by 698 days.

(21) Appl. No.: 10/237,201

(22) Filed: Sep. 9, 2002

(65) Prior Publication Data

US 2004/0047781 A1   Mar. 11, 2004

(51) Int. Cl.
*C01D 3/06* (2006.01)

(52) U.S. Cl. ............... 423/499.4; 423/499.5; 423/499.1; 423/184; 423/197; 423/220

(58) Field of Classification Search ............... 423/184, 423/197, 202, 220, 499.1, 499.3, 499.4, 499.5, 423/497
See application file for complete search history.

(56) References Cited

U.S. PATENT DOCUMENTS

| | | | |
|---|---|---|---|
| 4,155,819 A * | 5/1979 | Carlin | 205/527 |
| 4,586,993 A | 5/1986 | O'Brine et al. | |
| 4,602,984 A * | 7/1986 | Beaver et al. | 205/338 |
| 4,634,533 A * | 1/1987 | Somerville et al. | 210/722 |
| 5,028,302 A | 7/1991 | Rutherford et al. | |
| 5,126,019 A | 6/1992 | Rutherford et al. | |
| 5,240,687 A * | 8/1993 | Gallup et al. | 423/42 |
| 5,366,514 A | 11/1994 | Becenel, Jr. et al. | |
| 6,309,530 B1 | 10/2001 | Rutherford et al. | |
| 6,340,736 B1 * | 1/2002 | Coenen et al. | 528/196 |
| 6,921,522 B1 * | 7/2005 | Boryta et al. | 423/499.3 |

OTHER PUBLICATIONS

T.F.O'Brine COntrol Of Sulfates In Membrane System, pp. 326-349.
Lawrence F. Becnel, Jr. PE,Use of a close coupled Brine Evap-ration System for salt supply to a Alkali Plant Oct. 11, 2000.
Lawrence F.Becnel,Jr. PE usa of a closed couple Brine Evaporation system for Salt supply to a membrane Chlor Alkali Plant Oct. 9, 2001.

* cited by examiner

*Primary Examiner*—Ngoc-Yen Nguyen
(74) *Attorney, Agent, or Firm*—Peter F. Casella

(57) ABSTRACT

This invention relates to methods and installations for producing ultra pure sodium chloride salt crystals primarily for use in saturating depleted brine resulting from the electrolytic decomposition of saturated brine in chlor alkali membrane cells for the production of chlorine, caustic soda and hydrogen. More particularly, this invention relates to the production of ultra pure sodium chloride salt crystals by processing primary treated brine by first acidifying the primary treated brine, then stripping the carbonic acid produced by acidification as carbon dioxide, and then returning the brine to a pH of about 6 or higher which is sufficient for processing it in evaporation equipment where the ultra pure salt crystals are produced.

13 Claims, 3 Drawing Sheets

PRODUCTION OF ULTRA PURE SALT

BACKGROUND OF THE INVENTION

Figure 1:
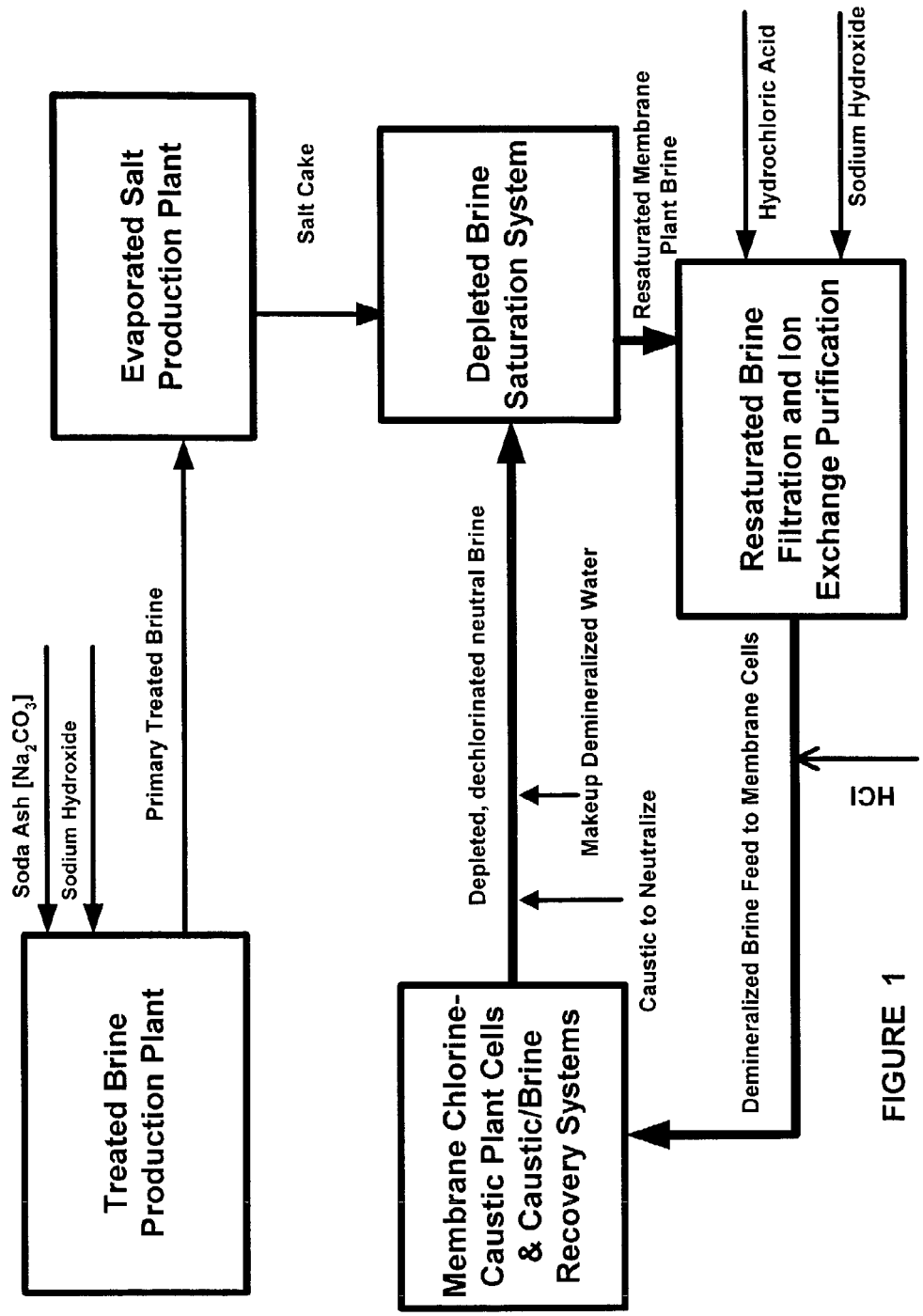

The use of membrane cells for electrolytic decomposition of brine to produce sodium hydroxide, chlorine and hydrogen is now the major process employed in new and converted plants because it provides many advantages over the older electrolytic processes, which required the use of mercury or deposited diaphragms. Among these advantages are elimination of mercury and asbestos pollution problems, reduced power consumption, improved cell efficiency, and better quality of chlorine and caustic.

The use of membrane cells requires salt of high purity with minimum impurities such as calcium, magnesium, barium, strontium, and other metallic impurities in the aqueous sodium chloride brine fed to the cells because the membranes are easily plugged or otherwise fouled. For example, one part or more of calcium ions per million parts of brine could be tolerated in the diaphragm type cells. This amount of calcium in the feed brine to membrane cells will damage the membranes severely and will reduce the membrane life from 3 to 5 years to less than 6 months. The high calcium causes a major drop in cell efficiency with a corresponding increase in power consumption resulting in shortened membrane life. Also, other metallic impurities, such as barium, strontium, magnesium, nickel, iron, copper, titanium, aluminum and other multivalent metals are detrimental in the brine being electrolyzed in membrane cells and must be removed or minimized. Furthermore, most membrane cells require a sodium sulfate level of less than 8 grams per liter in the feed brine to the cells to avoid lower efficiencies, including higher power costs, damage to the anode coatings, and damage to the membranes.

In the operation of diaphragm cells, the major operating cost factors are power, steam, and brine. Membrane cells offer significantly reduced power and steam costs but brine (salt) costs are higher than alternative cells because the membranes require high purity brine to operate efficiently. This necessitates removal of the buildup of certain impurities in the system, such as those referred to above, which are harmful to the performance of the membrane cells.

The source of sodium chloride used in membrane cells may be rock salt, solar salt, byproduct salt from an existing diaphragm cell plant, also known as caustic process or C.P. salt, purified evaporative salt, or brine delivered in a pipeline which has been solution mined from underground salt deposits. Nearly saturated sodium chloride brine from any source contains roughly three pounds of water per pound of sodium chloride. This invention relates to the process involving feeding the chlorine/caustic plant with purified evaporative salt.

PRIOR ART

U.S. Pat. No. 6,309,530 issued Oct. 30, 2001 provides a broad overview of the electrolytic processes for producing caustic soda (sodium hydroxide solution), chlorine and hydrogen that have been employed over the last several years.

U.S. Pat. No. 5,366,514 issued Nov. 22, 1994 provides an overview of salt plant evaporation technology and discloses an evaporative salt plant installation for producing high purity salt employing the combination of a gas turbine which drives a vapor compressor, whose exhaust gases are used to produce steam to drive a topping steam turbine generator, which in turn generates the electrical energy requirements of the plant.

Various methods for treating depleted brine for use in membrane cells are disclosed by T. F. O'Brien (O'Brien, T. F.; Control of Sulfates in Membrane Systems, pages 326–349), from Modern Chlor Alkali Technology, Volume 3, 1986, Chlorine Institute.

One method disclosed is to process raw untreated brine in multiple effect evaporators to produce a slurry of salt and brine that can be mixed with the depleted brine after the depleted brine has been de-chlorinated and neutralized. This brings the depleted brine back to the desired concentration of sodium chloride for use in the electrolytic decomposition, i.e. to about 24 weight percent or more sodium chloride. The brine is then treated in a conventional brine primary treatment system involving the addition of sodium carbonate and sodium hydroxide solutions to precipitate calcium as calcium carbonate and magnesium as magnesium hydroxide. The solids are settled and filtered out of the brine and the brine is sent to ion exchange resin towers for removal of additional calcium and magnesium as well as metal ions that may have been picked up in the raw brine evaporation step. This method of operation requires large amounts of treatment and neutralization chemicals and places a heavier burden on the ion exchange step thereby increasing costs.

Another method purifies the incoming brine using a conventional primary brine treatment system, with the brine then being fed to a multiple effect evaporator or to a mechanical vapor recompression system to produce purified solid salt to supply the salt requirement for the membrane cell plant. In this method dechlorination, neutralization and ion exchange secondary treatment are required in the diluted depleted brine recycle system. To protect the ion exchange resins and the membrane cells, the acidic, chlorine laden depleted brine must be de-chlorinated and neutralized before the solid salt is added, because the ion exchange resin is destroyed by chlorine exposure and only functions in a near neutral environment. Following the ion exchange treatment, the brine must be re-acidified before introduction to the membrane cells because the cells require acidified brine.

Still another method of reusing the depleted brine is to convert a portion of the cells in an existing diaphragm cell plant to membrane cells, treat all the incoming brine in the conventional primary brine treatment and secondary ion exchange systems, acidify and then feed all the brine to the membrane cells. The depleted brine is then brought up to proper brine concentration with recovered C.P. salt from the diaphragm cell plant evaporator system. The re-saturated brine is then fed to the diaphragm cells and/or the membrane cells depending on the particular plant material balance.

Other methods for reusing depleted brine are disclosed in U.S. Pat. Nos. 4,586,993, 5,028,302, and 5,126,019. The methods and systems described in these patents apply when the brine wells are located close enough to the plant site so that a dual pipeline may be installed at a reasonable capital cost.

The production of evaporated salt in conjunction with a membrane cell plant installation supplying treated brine as evaporator feed using current methods is limited by the equilibrium content of calcium dissolved in the treated brine being supplied as evaporator feed. Typically dissolved calcium concentration is 1 to 5 ppm by weight. As this brine is boiled for formation of salt crystals within the evaporator, calcium compounds precipitate from the evaporator mother liquor by reaction with sodium carbonate, since all dissolved compounds are concentrated by boiling off water. When the salt is elutriated and washed for recovery from the unit, a portion of calcium carbonate crystals travel through the elutriating system with the salt and contaminate it with an impurity level of 1 to 5 ppm. In a process now used commercially to produce these salt crystals with a mechanical vapor recompression (MVR) evaporator, which produces relatively uniform and large single sodium chloride crystals with few inclusions, a 150 to 200:1 reduction of impurity levels relative to those in the feed treated brine is experienced because the wash brine and mother liquor are very effectively removed from the surfaces of the single salt crystals by employing a 2 stage ultra pure water wash as the salt travels through the pusher centrifuges. For example, levels of sodium sulfate in the 1500 to 2250 ppm range are reduced to less than 10 ppm by the process. But calcium carbonate is not removed completely because it traverses as a crystal within the salt. The salt purity is thereby limited to calcium concentrations on the order of 1 to 5 ppm in the cake. This cake serves as salt feed to a large-scale membrane chlor alkali plant. After the salt cake is utilized to re-saturate recycle depleted sodium chloride brine within the chlor alkali plant installation, great pains are taken to remove the dissolved metal ions, including calcium and magnesium ions, to produce brine for feed to the membrane electrolysis cells where chlorine, hydrogen and sodium hydroxide are produced from salt. An expensive ion exchange system is employed for reducing calcium plus other metals to less than a total of 20 parts per billion. This calcium reduction is accomplished at significant expense requiring multiple cycles for regenerating the ion exchange resins; regenerations every 7 to 10 days are typical. The resins are rapidly exhausted because of the substantial load of contaminating ions to be removed in order to obtain a salt purity acceptable for maintaining a suitable life for the membranes. Ion exchange systems needed in the present commercial operations are expensive because the resin employed is costly and requires periodic replacement after continuing loading and regeneration cycles, and demineralized water, hydrochloric acid, and sodium hydroxide must be utilized for regenerating resin beds, thereby adding to the costs.

OBJECTS OF THE INVENTION

The principal object of this invention is to produce substantially pure salt crystals, i.e. ultra pure salt containing a total of near zero to 500 ppb of calcium and other multivalent metal ions, while at the same time providing substantial reduction in operating and material costs.

A second object is to avoid precipitation of the metal species during preheating and evaporation thus reducing fouling in the evaporator piping, brine preheating, and brine deaeration units.

A third object is to provide an intermediate salt quality that allows membrane chlor alkali plants to utilize the ultra pure salt thereby reducing their ion exchange regeneration frequency thus reducing their processing acidification, neutralization, and resin costs, thereby providing the best economic selection for operating existing membrane plants.

A fourth object is to provide an even purer salt quality that allows for elimination of the secondary brine treating system, particularly the ion exchange unit, within membrane chlor alkali plants of any scale, thereby providing the best economic selection for new membrane plants.

A fifth object is to supply sodium hypochlorite cell operators of any scale with ultra pure salt to virtually eliminate acid washing of the cells for metal deposits and thus prolong cell life.

A sixth object is to employ this ultra pure salt in mercury cell plants to substantially reduce sludge generation.

A seventh object of this invention is to provide installations capable of accomplishing the first six objects within a practical operating system.

BRIEF DESCRIPTION OF THE INVENTION

In accordance with this invention, by adding hydrochloric acid to acidify primary treated brine from a normal pH range of 9.5 to 12 down to a pH of 2 to 4, the dissolved reactive metal species are converted to soluble chloride species and concomitantly dissolved sodium carbonate and hydroxides are converted to carbonic acid [dissolved carbon dioxide]. These dissolved excess concentrations of sodium carbonate and sodium hydroxide are required to drive precipitation of the metal carbonates and hydroxides during primary brine treating. Acidifying the carbonates and hydroxides produces soluble salts, water and dissolved carbon dioxide, which is gas stripped and vented. Following stripping, the brine is neutralized using sodium hydroxide before feeding it to the evaporator for the purpose of avoiding metals corrosion. When this neutralized brine is fed to the evaporator, multivalent metal species, such as calcium, magnesium, barium, strontium and other common contaminants of salt, no longer precipitate with the salt from the mother liquor as occurs in the present operation. The reactive metals, which have been converted to soluble species and/or sodium carbonate in solution, are eliminated, by employing the teachings of this invention. Although these metal species concentrate within the evaporator mother liquor, their concentrations are controlled below solubility limits and no further concentration of sodium carbonate and metal hydroxides occurs, since these are now absent thus unavailable to cause metals precipitation with the unit. The still dissolved metal species are removed from the system with the mother liquor purge. The resultant washed salt product is ultra pure salt containing below 500 ppb calcium and other multivalent metals. The actual concentration is a function of tenacity of primary treating and acidification and the wash ratio in the evaporation system, and there will be an optimal operating point depending upon each application.

THE FIGURES

FIG. 1, "System Before Acidification and Neutralization", is a block diagram of the evaporative salt plant installation, as it presently exists showing the treated brine production plant, the evaporated salt plant, and the chlor alkali plant block diagram.

Figure 2:
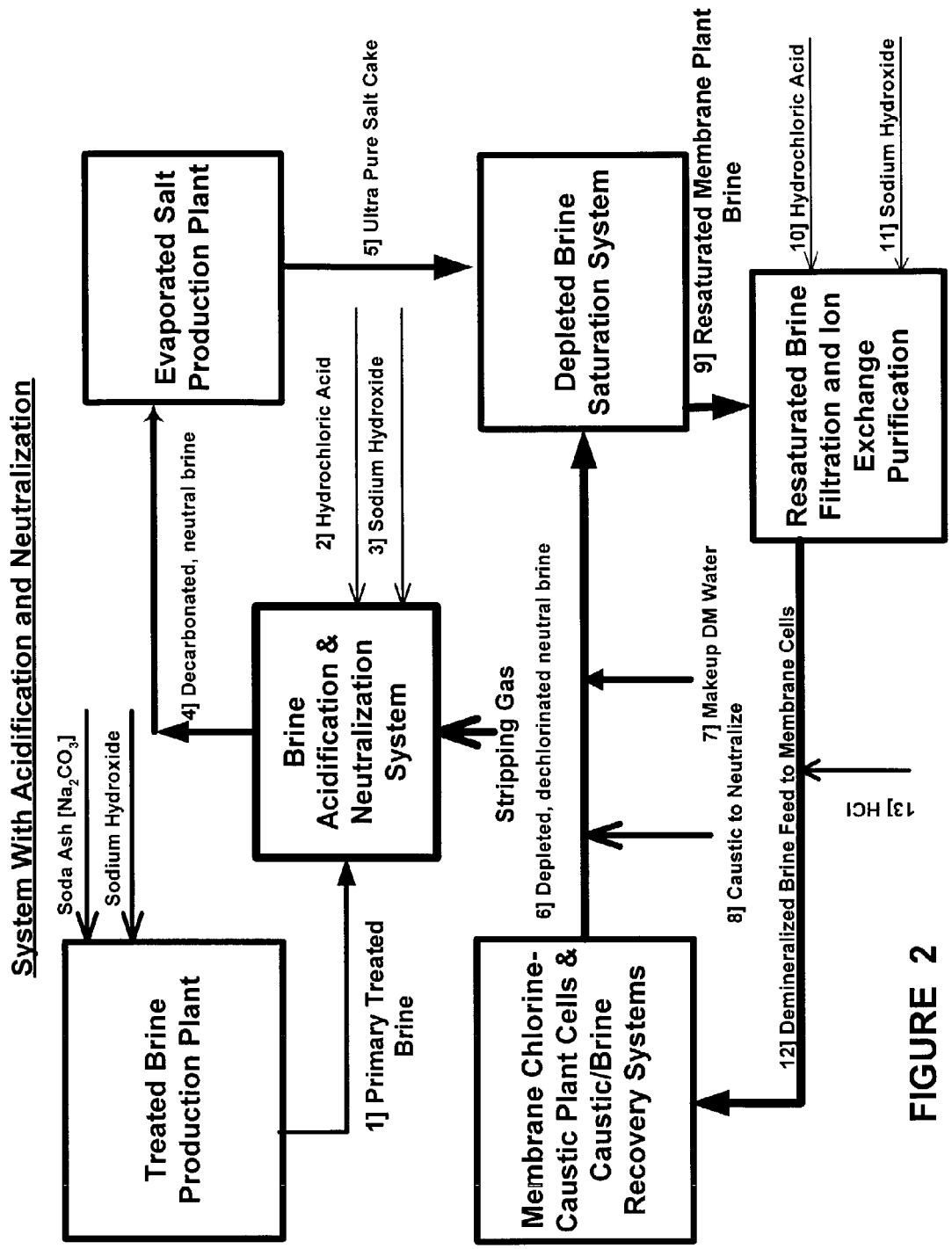

FIG. 2, "System With Acidification and Neutralization", is a block diagram of the system of this invention showing acidification, stripping, and neutralization incorporated into the existing process shown in FIG. 1.

Figure 3:
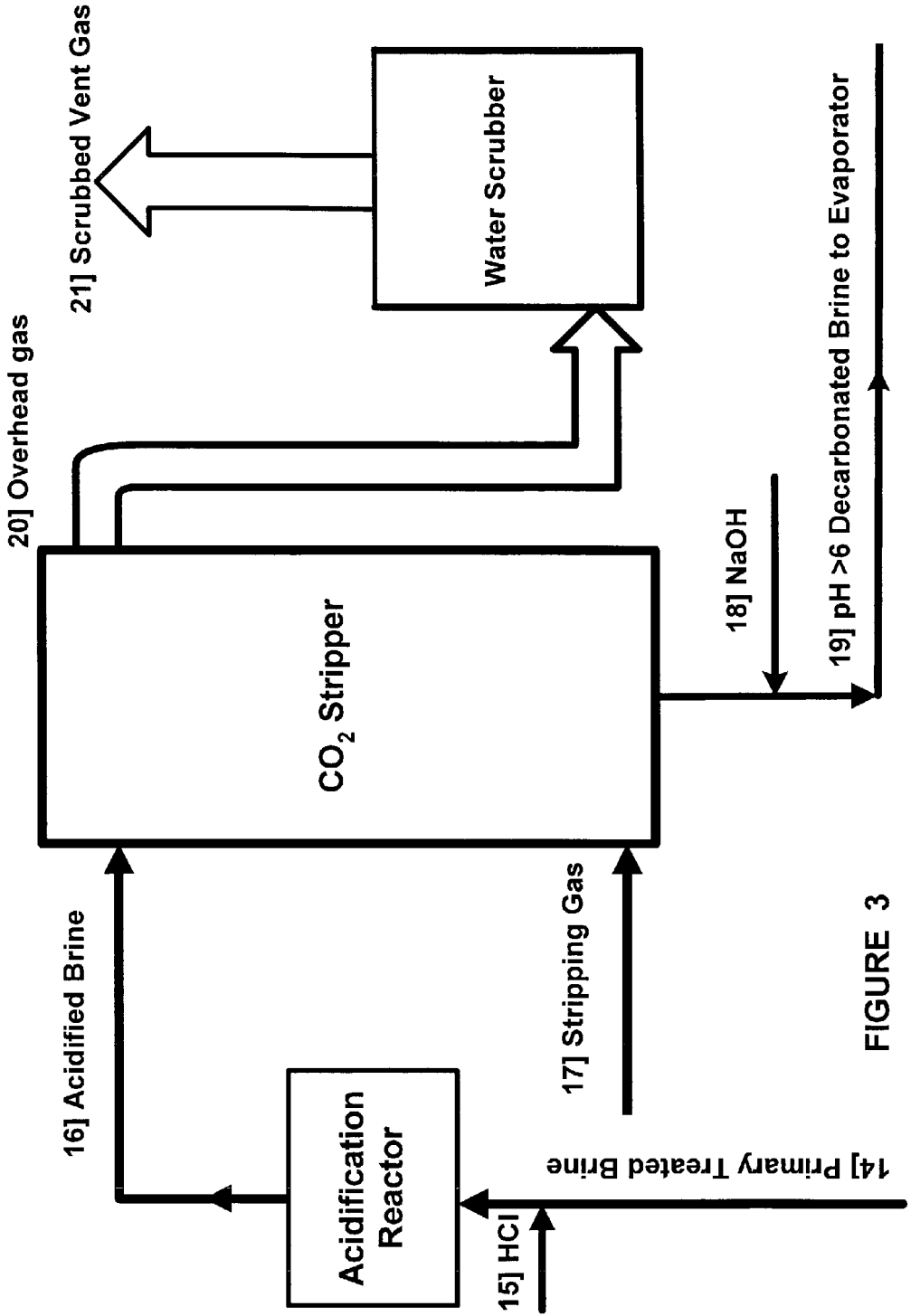

FIG. 3, "Treated Brine Acidification, Stripping, & Neutralization Block Diagram", is a block diagram showing more detail of the acidification, stripping, and neutralization block of FIG. 2.

DETAILED DESCRIPTION OF FIGURES

Referring to the drawings briefly described above, FIG. 1 is a block diagram of a system presently installed and operated in the southwestern part of the United States and is presented as a typical embodiment of prior art related to the invention. This system produces approximately three quarters of a million short tons per year of evaporated salt containing 1000 to 5000 parts per billion calcium ions for supplying the requirements of a membrane chlor alkali plant which has operated for several years. A more detailed description of the system is given in a paper presented to the El Tech Seminar in Cleveland, Ohio on Oct. 11, 2000 and a related paper presented at the Solution Mining Research Institute meeting in Albuquerque, N. Mex. on Oct. 9, 2001. These publications are made a part of this specification since they illustrate a typical installation that may be modified in accordance with the teachings of this invention and also because they show the different types of equipment employed in such plant installations including the primary brine treating equipment, the concentrators which are the evaporators in the salt plant system, and the secondary brine treatment system including the ion exchange system.

FIG. 2 is a block diagram showing the embodiments of this invention when included in the process of FIG. 1. In the method of this invention, primary treated brine (stream 1) at pH 9.5 to 12 is first acidified using concentrated aqueous hydrochloric acid (stream 2) to pH 2 to 4 to convert metal carbonate and bicarbonate species to carbonic acid and dissolved metal carbonate and hydroxide species to their chloride equivalents. The carbonic acid is stripped as carbon dioxide and the resulting brine is returned to a pH greater than 6, preferably 7 to 8, by using sodium hydroxide or any suitable base (stream 3) to avoid metals corrosion in the evaporator equipment. Operation at above pH 8 is not necessary to achieve the objects of this invention. The resulting de-carbonated neutral brine (stream 4) is then fed to the evaporated salt production plant where ultra pure salt cake (stream 5) is produced. The salt cake is used to re-saturate membrane plant depleted, de-chlorinated neutral brine (stream 6), which contains de-chlorinated cell exit depleted brine, makeup demineralized water (stream 7) and caustic (stream 8), to produce near neutral re-saturated membrane plant brine (stream 9). The stream is fed to re-saturated brine filtration and ion exchange purification for final removal of metal species via ion exchange. With each regeneration of an ion exchanger bed, hydrochloric acid (stream 10) and sodium hydroxide (stream 11) are consumed to restore the ion exchange resin for the next cycle. The resultant brine exit the ion exchanger constitutes demineralized brine feed to the membrane cells (stream 12), which is re-acidified prior to feeding to the cells utilizing hydrochloric acid (stream 13). The membrane caustic-chlorine plant cells & caustic/brine recovery systems produce stream 6 for recycle in addition to products chlorine, sodium hydroxide, and hydrogen for further processing.

Referring to FIG. 3, primary treated brine (stream 14) is acidified in an Acidification Reactor to pH 2 to 4 with HCl (stream 15) and the acidified brine (stream 16) is fed to a stripper where carbon dioxide produced in acidification is stripped with stripping gas (stream 17). The stripped brine exiting the stripper is neutralized to pH greater than 6 with NaOH (stream 18) to produce de-carbonated brine (stream 19 of FIG. 3 and stream 4 of FIG. 2) for feeding the evaporator. Overhead gas from the CO2 stripper (20) is water scrubbed to produce the scrubbed vent gas (stream 21) free of brine droplets.

DETAILED DESCRIPTION OF THE INVENTION

From the foregoing description of those figures depicting this invention and the following discussion, it is shown below that there are many advantages over the prior art disclosed or technology employed commercially in addition to the major advantage of producing ultra pure salt containing near zero to 500 parts per billion calcium ions rather than 1000 to 5000 ppb as is currently produced. Among the other advantages are as follows:

In the feed system of the evaporator, the treated brine is pre-heated in a series of liquid-liquid heat exchangers and deaerated in packed stripping columns. With rising temperature, further reaction causing calcium carbonate to precipitate from the brine fouls the heaters and stripping columns with solids. These heating units must be acid washed as often as every other day, sometimes every day. Cleaning is effected by temporarily bypassing the fouled heater or deaerator and acid washing it to dissolve the carbonate. This is costly requiring acid, manpower, and reducing the energy efficiency and capacity of the evaporator. By neutralizing the brine, the fouling effect is eliminated because there is no sodium carbonate to drive the precipitation reaction and produce the fouling solids.

The ultra pure salt, when utilized to feed the chlor alkali plant, results in a substantial (at least 14:1) secondary treatment metals load reduction resulting in reduced ion exchange bed resin regeneration frequency. This increases ion exchange resin life proportionately and saves substantial quantities of hydrochloric acid, caustic, and demineralized water employed in resin regeneration. Also improved is chlor alkali cell current efficiency and membrane life. Cell maintenance costs are reduced with increased membrane life and chlor alkali plant operating utility is enhanced by the longer membrane life.

This invention improves the source of pure water for a demineralized water supply for the chlor alkali facility and adjoining plants by eliminating carbonic acid from the evaporator condensate resulting in reduced frequency of regeneration of the water demineralizer resin.

This invention also facilitates reduction of the quantities of sodium carbonate excess in primary treatment and hence the quantities of hydrochloric acid required for acidification, because higher concentrations of calcium, up to about 500 ppb, may be tolerated in the system when serving membrane plants utilizing secondary brine treatment ion exchange. An economic optimization of the operating system must be made to exactly define target concentrations of sodium carbonate excess and calcium in ultra pure salt.

With the teachings of this invention in place, it is possible, although not necessary, to eliminate from the membrane plant essentially all of the secondary brine treating equipment including:

1. depleted brine de-chlorination and pH adjustment to prepare for ion exchange,
2. re-saturated brine filtration [called secondary filtration],
3. saturated brine ion exchange treatment,
4. and re-acidification of the saturated brine following ion exchange.

Although the invention and its advantages have been described with respect to membrane chlor alkali plants, it is also applicable to mercury cell chlor alkali plants as salt supply. Here the brine treating section of the mercury cell plant is reduced or eliminated and generation of sludge contaminated with mercury is substantially reduced providing a very desirable environmental effect.

In addition, use of ultra pure salt in any scale sodium hypochlorite generator will virtually eliminate cell acid washing to remove metal deposits thus improving the life of the cell and reducing maintenance and reducing average electric power consumption.

In any process utilizing only salt as raw material, substitution of ultra pure salt will eliminate generation of solids waste. An example is the sodium chlorate electrolysis plant.

Among the stripping gasses, which may be employed in accordance with this invention, are air, steam, nitrogen or other inert gasses, and hydrocarbon gasses such as methane as long as the gas does not interact with the process.

Among the available strippers, I prefer the employment of the packed column type rather than trayed, venturi, or other type strippers, although these may be used. The packed column offers good efficiency and may be constructed of corrosion resistant materials economically. The same comments apply to the water scrubber column. For example, among the scrubbers that may be employed, I prefer the packed column type, although trayed, venturi, or other types may be used. Accordingly, my invention allows for choosing the most efficient and economic combination of such equipment.

Various type of concentrators may be used, the preferred embodiment uses MVR evaporators such as illustrated in the El Tech and Solution Mining publications referred to in the Detailed Description Of Figures, which are typical of current industrial practice.

Operation below pH 2 offers no benefit because too much acid is used and too much caustic is then required to neutralize the acid following stripping. Furthermore, conversion of the required carbonate species occurs in the pH range of 2 to 4. Operation above pH 4 does not result in sufficient carbonate conversion to strippable carbon dioxide.

Although the installation I have described employs a pipeline type acidification reactor and neutralization reactor, which is the most economic choice, other types, such as stirred tank reactors or packed column reactors may be employed.

Further, although I have employed concentrated aqueous hydrochloric acid as the acidifying agent in the forgoing description, it is of course the preferred acidifying agent when a chlor alkali membrane installation is involved and it is preferred to use concentrated acid although weaker concentrations may be employed. Also, concentrated liquid sodium hydroxide is the preferred neutralization agent to be employed in the chlor alkali membrane installations.

Washing operations described herein primarily involve washing of crystalline salt produced within the evaporator by conventional means for the purpose of minimizing surface contamination on the salt prior to delivering it to the membrane plant. Wash fluids are feed brine and evaporator condensate, but could be other available pure brine streams when compatible with the process. The calcium, magnesium, and other metal ions concentration in the product ultra pure salt are all within the surface contamination that pure water washing fails to remove. Generally the normal washing procedure will suffice, but, if that proves insufficient, the surface contaminations may be removed by a feed aqueous hydrochloric acid wash of the salt prior to employing the acid in the acidification reactor. This is accomplished with no increase in ingredient or energy costs.

Washing of fouled brine preheaters and the brine deaerators involves water, acid, and brine flushing for the purpose of removing deposited multivalent metal compounds, particularly calcium carbonate, thus restoring efficiency of the equipment. The water scrubber employed is used to reduce emissions of acidified brine droplets to a negligible amount. In a preferred embodiment of this invention, a separate scrubber is employed, however, multiple demisters or demisters and a scrubber incorporated within the top of the stripping column may also be used depending upon the local environmental regulations and conditions.

It should be noted that by first employing the concentrated muriatic acid to wash the salt produced by this invention any surface contamination by undesirable metal ions that may traverse or slip through the system onto the product because of potentially inefficient wash ratios of below about 40 to 1 within the concentrator or evaporator system, will result in producing an ultra pure salt so free of metal contaminants that adversely affect the cell membranes, that the ion exchange system and processing may be eliminated.

Contamination of the salt crystals may be a surface effect, i.e. calcium carbonate crystals formed within the concentrator or evaporator may be loosely attached to the salt surface. Acid washing experiments indicate that the majority of the calcium carbonate contaminant is included within the salt crystals. This invention avoids these "inclusions" by eliminating precipitation of calcium carbonate because it no longer exists as carbonate and also eliminates other metal carbonates during the crystallization. Furthermore, any surface effect contamination of the crystals is removed in accordance with this invention by the washings referred to above.

In the foregoing description of this invention and in the appended claims the term near zero means about 2 to 5 percent of the range involved, thus near zero to 500 ppb means about 2% to 5% of the 500 ppb. It is to be understood that the analytical instruments and techniques employed are a factor in measurement of such small quantities of materials.

By my use of "plant" and "installation" in the specification and claims, I intend that either usage cover large scale industrial plants as illustrated in the El Tech Seminar and Solution Mining presentations, or such small scale installations as may be employed in any scale sodium hypochlorite generators whether for use in purifying swimming pool water or for commercial manufacture of household bleaching solution.

Although I have described my invention using primary treated brine as the preferred embodiment, other brines may be employed. For example brine that has not necessarily been treated by currently known processing known to produce "primary treated brine" including processes that become available in the future by new or modified technologies that may be used to produce an equivalent composition. Also brines that result from partial or inefficient use of the present commercial primary treatments of brine which result in a different composition and yet can be employed in my invention with equivalent results.

Although this invention has been described using specific drawings and examples and certain specific embodiments thereof have been emphasized, I do not intend that this invention be limited in scope except as expressly defined in the appended claims.

The invention claimed is:

1. The method for producing ultra pure salt, containing below 500 parts per billion (ppb) of calcium and other multivalent metal ions, which comprises:

acidifying primary treated brine from pH 9.5 to 12 to pH 2 to 4 by adding hydrochloric acid, thereby converting the calcium, barium, strontium, and other reactive multivalent metal compounds to soluble chlorides, such acidification also converting excess sodium carbonate and hydroxides to salt, water, and dissolved carbon dioxide, removing the carbon dioxide by stripping, neutralizing the stripped material to a pH of at least 6 to prevent metals corrosion but not exceeding 8 to prevent carbon dioxide uptake from the surroundings, concentrating the neutralized stripped material and washing the crystals so produced, to produce ultra pure salt crystals.

2. The method of claim 1 wherein the ultra pure salt produced contains 5 to 200 ppb calcium and other multivalent metal ions.

3. The method of claim 1 wherein the concentrating is by evaporation.

4. The method of claim 1 wherein the stripping is by an inert gas.

5. The method of claim 1 wherein the stripping is by air stripping.

6. The method of claim 1 wherein the stripping is by vacuum stripping with nitrogen.

7. The method of claim 1 wherein the stripping is by steam stripping.

8. The method of claim 1 wherein aqueous concentrated hydrochloric acid is employed in acidifying the primary treated brine.

9. The method of claim 8 wherein the hydrochloric acid is introduced into the primary treated brine through a pipeline reactor.

10. The method of claim 1 wherein liquid concentrated sodium hydroxide is employed to neutralize the stripped material.

11. The method of claim 1 wherein the stripped material is introduced into a water scrubber to reduce emissions of brine droplets.

12. The method of claim 1 wherein condensate obtained in the concentrating step is employed in washing the crystals.

13. The method of claim 1 wherein the primary treated brine has a pH of about 10 and is acidified to a pH of about 3.

* * * * *

UNITED STATES PATENT AND TRADEMARK OFFICE
CERTIFICATE OF CORRECTION

PATENT NO. : 7,037,481 B2 Page 1 of 1
APPLICATION NO. : 10/237201
DATED : May 2, 2006
INVENTOR(S) : Lawerence F. Becnel, Jr.

It is certified that error appears in the above-identified patent and that said Letters Patent is hereby corrected as shown below:

Title Page
Please Insert Item [76],

--The errors are in mis-spelling the inventors surname, The correct spelling is BECNEL, not Bececnel as printed on the attached Issue Notification. Further the correct spelling of Applicants Representative surname is CASELLA, not Gasella as printed on the attached Issue Notification. Still further, the correct street address of Peter F. Casella is 987 Elliott Drive, not 987 Elliott Center Drive as printed on the attached Issue Notification.--

Signed and Sealed this

Nineteenth Day of September, 2006

JON W. DUDAS
*Director of the United States Patent and Trademark Office*